United States Patent Office 3,072,531
Patented Jan. 8, 1963

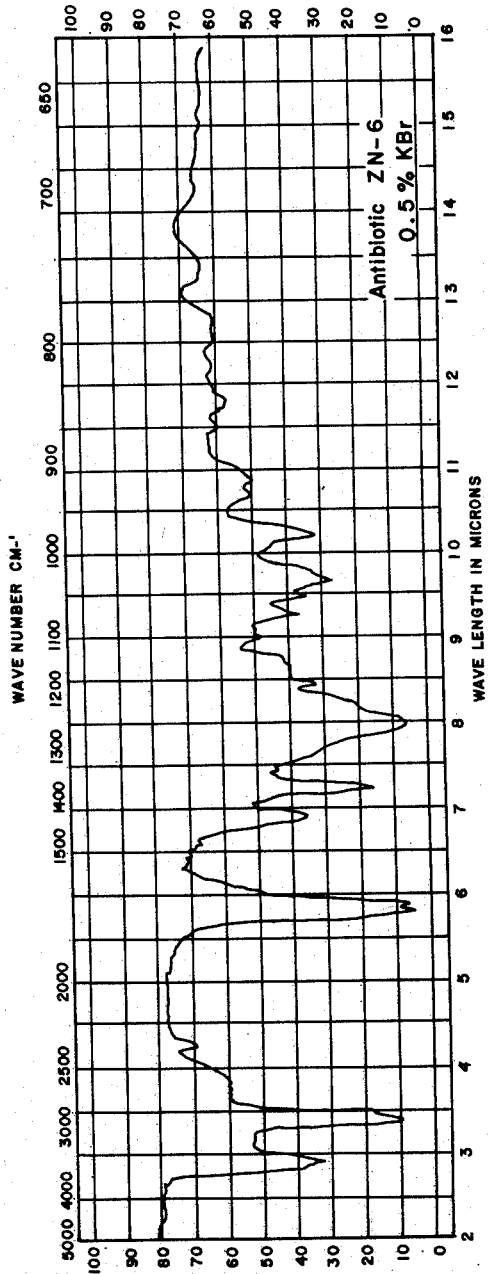

---

3,072,531
ANTIBIOTIC AND THERAPEUTIC COMPOSITIONS THEREOF
Wagn Ole Godtfredsen and Henning Otto Bojsen Lorck, Copenhagen, and Sverre Jahnsen, Skovlunde, Denmark, assignors to Løvens Kemiske Fabrik Ved A. Kongsted, Ballerup, Denmark, a firm
Filed Sept. 12, 1961, Ser. No. 138,234
Claims priority, application Great Britain Sept. 21, 1960
18 Claims. (Cl. 167—65)

This invention relates to a new and useful acidic antibiotic called Antibiotic ZN-6, to its production by fermentation of the fungus *Fusidium coccineum* Fuck (K. Tubaki), to methods for its recovery and concentration from crude solutions and to processes for its purification.

FIGURE 1 is an infra-red absorption spectrum which is useful in describing certain properties of Antibiotic ZN-6 according to the invention.

The present invention includes within its scope the antibiotic in dilute forms as crude concentrates, the pure antibiotic itself and its salts with pharmaceutically acceptable inorganic and organic bases as well as pharmaceutic compositions and a dosage unit containing the same.

The organism producing the antibiotic of the present invention can be obtained from Centraal Bureau voor Schimmelcultures, Baarn, Holland registered alphabetically under the name *Fusidium coccineum* Fuck (K. Tubaki. The strain is classed with the species *Fusidium coccineum*, and a synonym of that species is *Ramularia coccinea*. The genus Fusidium belongs to the tribus Oosporeae, the family Mucedinaceae, and the order Hyphomycetales.

Antibiotic ZN-6 is a weak carboxylic acid capable of forming a variety of salts with inorganic and organic bases. An electrometric titration performed in 80% aqueous ethanol gave a $pK_a$-value of 7.25 corresponding to a $pK_a$-value of about 5.3 in water. Furthermore the titration studies indicate an equivalent weight of the substance amounting to 516.

Investigations dealing with its chemical structure, and its analytical data, indicate that the substance has the elementary formula $C_{31}H_{48}O_6$ and contains in the molecule a cyclopentenopolyhydrophenanthrene ring system which is substituted with two hydroxy groups, one acetoxy group and four methyl groups, and which in the 17-position is connected by a double bond with the α-carbon atom of 5-methyl-4,5-heptenoic acid.

As yet, the structural formula of Antibiotic ZN-6 has not been exactly established, but the substance is believed to have the proposed Formula I, in which the wavy connection-lines indicate that the configuration in question is uncertain.

Formula I

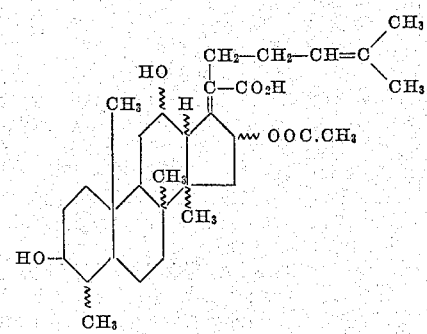

Antibiotic ZN-6 is sparingly soluble in water and hexane, whereas it is soluble in ethanol, acetone, methyl butyl ketone, amyl acetate, chloroform and similar solvents.

On paper chromatography using the systems described by Bush (50 Biochemical Journal, 370 (1952)), the movements of Antibiotic ZN-6 correspond to the $R_f$-values 0.38 and 0.73 in the B(1)- and B(5)-system respectively.

Antibiotic ZN-6 is capable of forming solvates with certain solvents. With benzene for instance it forms a crystalline solvate, which is soluble in hot benzene, but sparingly soluble in cold benzene. The benzene solvate of Antibiotic ZN-6 has a melting point of 189–189.5 degrees centigrade.

After drying the said solvate at 50 degrees centigrade and an absolute pressure of 0.01 mm. Hg to constant weight, a pure product is obtained, which is free from benzene, and has the melting point of 191–192 degrees centigrade, the specific rotation $[\alpha]_D^{22}$ of minus 9 degrees in a 1% solution in chloroform, and at 220 m$\mu$ a molar extinction coefficient of 8000 in ethanol and no characteristic absorption bands above this wave-length.

The pure Antibiotic ZN-6 is further characterized by its spectrum in the infra-red region as shown in FIGURE 1, from which it appears that it exhibits characteristic absorption bands at the following frequencies, expressed in reciprocal centimeters: 1265, 1385, 1695, 1730 and 3450, using for the purpose the potassium bromide technique.

According to bacteriological experiments, Antibiotic ZN-6 has proved to be effective against a number of pathogenic micro-organisms, especially *Staphylococcus aureus*, *Neisseria gonorrhoeae* and their penicillin-resistant strains, *Neisseria meningitides*, *Mycobacterium tuberculosis* and the streptomycin-, isonicotinic acid hydrazide- or p-aminosalicylic acid-resistant strains of the same organism, and *Corynebacterium diphtheriae*.

The more specific antifungal and antibacterial activity of the antibiotic of the invention can be noted from the following Table I in which the activity is expressed as the amount of the Antibiotic ZN-6 Na-salt in mgs. per liter which causes 50% inhibition of the organism in question after the period of time (in hours) indicated:

TABLE I

| Organism | Substrate | Time | Activity |
|---|---|---|---|
| *Staphylococcus aureus* | Bouillon | 24 | 0.063 |
| *Staphylococcus aureus*, penicillinase-producing strain | do | 24 | 0.050 |
| *Staphylococcus aureus*, penicillin-resistant laboratory strain producing no penicillinase | do | 48 | 0.16 |
| *Neisseria gonorrhoeae* | Blood-ascites agar | 24 | 0.32 |
| *Neisseria gonorrhoeae*, penicillin-resistant strain | do | 24 | 0.63 |
| *Neisseria meningitides* | do | 24 | 0.32 |
| *Haemophilus influenzae* | do | 24 | 10.0 |
| *Diplococcus pneumoniae* | Bouillon with 5% serum | 24 | 16.0 |
| *Streptococcus pyogenes* | do | 24 | 3.2 |
| *Streptococcus (ooepidemicus* | do | 24 | 2.5 |
| *Streptococcus agalactiae* | do | 24 | 16.0 |
| *Streptococcus lactis* | do | 24 | 13.0 |
| *Streptococcus faecalis* | do | 24 | 5.0 |
| *Pseudomonas aeruginosa* | Bouillon | 24 | >30.0 |
| *Vibrio comma* | do | 24 | >30.0 |
| *Alcaligenes faecalis* | do | 24 | 13.0 |
| *Escherichia coli* | do | 24 | >30.0 |
| *Klebsiella pneumoniae* | do | 24 | >30.0 |
| *Serratia marcescens* | do | 24 | >30.0 |
| *Proteus vulgaris* | do | 24 | >30.0 |
| *Salmonella typhimurium* | do | 24 | >100.0 |
| *Bacillus subtilis* | do | 24 | 1.6 |
| *Mycobacterium tuberculosis* var. hom. | Dubo's | 144 | 0.79 |
| *Mycobacterium tuberculosis* var. hom. streptomycin-resistant strain | do | 144 | 1.6 |
| *Mycobacterium tuberculosis* var. hom. strain resistant to p-amino-salicylic acid | do | 144 | 1.6 |
| *Mycobacterium tuberculosis* var. hom. strain resistant to isonicotinic acid hydrazide | do | 240 | 0.50 |

TABLE I—Continued

| Organism | Substrate | Time | Activity |
|---|---|---|---|
| Candida albicans | Sabouraud's | 24 | 100.0 |
| Tricophyton mentagrophytes | do | 72 | 100.0 |
| Aspergillus niger | do | 72 | 100.0 |
| Clostridium perfringens | Thioglycollate medium. | 48 | 0.25 |
| Clostridium tetani | do | 48 | 0.02 |
| Actinomyces bovis | do | 48 | 0.05 |
| Corynebacterium pyogenes | Meat infus. broth with 10% serum. | 24 | 0.05 |

Clinical tests carried out in connection with the present invention have demonstrated that Antibiotic ZN-6 and certain of its salts meet the requirements for pharmaceutically acceptable antibiotics, since they are usable in the treatment of infectious diseases, and particularly valuable in the treatment of those which are produced by various strains of Staphylococci, including the penicillin-resistant strains.

For pharmaceutical purposes, Antibiotic ZN-6 may be used as such or in the form of its more or less water-soluble salts with atoxic inorganic or organic bases.

Although aqueous solutions of Antibiotic ZN-6 salts can be administered parenterally, the salts are preferably given by mouth, since they pass readily from the gastro-intestinal tract to the body-fluids, in which an adequate concentration of the antibiotic is demonstrable for a satisfactory period of time.

This has been established in a resorption test in which 8 persons were individually given by mouth a single treatment consisting of two capsules each containing 0.250 gram of the sodium salt of Antibiotic ZN-6, whereupon the plasma-concentrations were determined at fixed intervals after the intake. The results obtained are given in Table II in which the figures indicate the said plasma-concentration expressed in $\mu$-gms. per ml. plasma one or more hours after the intake.

TABLE II

| Person/hours | 1 | 2 | 3 | 4 | 7 | 9 | 12 |
|---|---|---|---|---|---|---|---|
| Group I: | | | | | | | |
| A | 1.6 | 9.5 | 7.2 | 5.5 | 2.9 | 2.1 | 1.5 |
| B | 0.9 | 1.2 | 3.0 | 2.7 | 3.6 | 3.1 | 2.2 |
| C | 0.6 | 10.0 | 6.1 | 6.1 | 5.2 | 4.0 | 2.2 |
| D | 0.8 | 11.0 | 8.5 | 9.3 | 5.2 | 4.7 | 1.7 |
| Group II: | | | | | | | |
| E | 1.6 | 6.6 | 8.1 | 6.6 | 4.0 | 3.2 | 2.4 |
| F | 0.6 | 1.7 | 7.5 | 6.1 | 3.4 | 3.0 | 2.4 |
| G | 2.5 | 12.3 | 8.6 | 6.7 | 3.5 | 3.1 | 1.8 |

In Group I the persons were given the drug on an empty stomach, whereas the persons of Group II were given the drug after a meal.

In a similar test, the average plasma-concentration found 24 hours after the intake of the same amount of the drug amounted to 0.75 $\mu$-gms. per ml., indicating the extremely slow elimination of the substance from the body.

A sufficient low acute toxicity of Antibiotic ZN-6 has been observed in animal experiments in which the test animals were mice. The following values of $LD_{50}$ expressed in mgs. per kilo body weight were found:

(a) The sodium salt of Antibiotic ZN-6 administered intravenously _____ 200–250
(b) The sodium salt of Antibiotic ZN-6 administered subcutaneously _____ 400
(c) The benzene solvate of Antibiotic ZN-6 administered perorally _____ >1500

Furthermore, in prolonged toxicological experiments, in which the animals, male and female rats, were treated orally six days out of each week with the Antibiotic ZN-6 sodium salt in doses of 0.400 gram per kilo of body weight, neither significant differences in weight between the test animals and control animals nor any pathological changes caused by the drug were observed, indicating the absence of chronic toxicity.

The unique properties of Antibiotic ZN-6 have been demonstrated to a more striking extent by controlled clinical use of the Antibiotic ZN-6 sodium salt in the form of a suitable composition incapsulated in gelatine capsules on patients suffering from furunculosis, osteomyelitis and endocarditis.

After oral treatment of the patients at daily or like intervals convenient for practical use and for a sufficient period of time, the cures were almost 100% without the occurrence of secondary effects or toxic reactions, and no relapses were observed even after prolonged observations.

For clinical treatments, the water-soluble salts of Antibiotic ZN-6, and particularly the sodium salt, is applicable.

On the other hand, slightly water-soluble salts of Antibiotic ZN-6 or even the free acid, can also be used for oral administration, whereby the absorption rate of the drug may decrease, so that it preferably exerts its activity in the gastro-intestinal tract itself, which may be desirable in the treatment of certain diseases.

Besides, the slightly water-soluble salts of Antibiotic ZN-6 may be injected in the form of a suspension of the salt in a suitable medium in order to produce even longer blood levels of the antibiotic than described before.

In the method of the invention the fungus Fusidium coccineum Fuck (K. Tubaki) is grown under aerobic conditions in a fermentation medium containing carbohydrates, nitrogen sources, e.g. complex organic materials such as proteins, and suitable amounts of the inorganic salts and other substances necessary for the nutrition of the fungus, and the fermentation is continued until a substantially antibiotic activity has been imparted to the said solution, after which the Antibiotic ZN-6 thus produced is recovered, concentrated and isolated in pure form or is converted to one of its salts with pharmaceutically acceptable bases by way of known reactions.

When performing the method of the invention, the production rate of Antibiotic ZN-6 is determined throughout the fermentation by routine evaluation of the activity of culture filtrated, for which purpose the agar-plate assay may be employed, using for instance Staphylococcus aureus as the test organism.

According to results obtained from the production of Antibiotic ZN-6 on a technical scale, the optimum yield of the substance was obtained in the course of 80–100 hours when the process of fermentation was performed between 20 and 30 degrees centigrade, and preferably between 24 and 28 degrees centigrade. The time in usual practice is 2 to 7 days.

However, the said ranges are not limiting to the invention, since the period of time required for obtaining the said yields depends to some degree on the mechanical design of the fermentation vessel and the type of agitator used.

In this connection it should be mentioned that the vessels employed were commercial size units containing from 10 to 30 cm.³ of the culture medium and not specifically designed for the production of Antibiotic ZN-6.

A variety of the well known culture media have proved usable as culture media for carrying out the method, although those containing as the protein source corn steep liquor or soy bean meal, and as the carbohydrate source glucose or saccharose are preferred. Among other constituents of an adequate culture medium may for instance be mentioned yeast extract, glycerine, maltose, fructose, fatty acids, casein hydrolysate, aminoacids and water-soluble vitamins.

When the production of Antibiotic ZN-6 in the fermentation process ceases, or when a satisfactory yield has been obtained, the antibiotic substance can be recovered by a variety of procedures.

Advantageously, the first step to recover the substance consists in separating the mycelium from the culture fluid, for instance by filtration. The Antibiotic ZN-6 can be concentrated by contacting the broth with a solid absorbing agent and eluting the substance from the said agent, for which purpose may be used as the adsorbing agent for instance active carbon or ion-exchange resins or, preferably, the broth is extracted with a suitable solvent or mixtures of solvents, if necessary after having adjusted the aqueous Antibiotic ZN-6-containing medium to an adequate pH-value, preferably below 7.0 and most desirably in the range between 3.0 and 6.0. As suitable solvents can be mentioned esters, ketones or halogenated hydrocarbons. In the commercial scale production however, specifically methyl isobutyl ketone, amyl acetate and butyl acetate have proved to be suitable for the extraction of the fermentation broth.

When the active substance has been extracted from the broth, it can be recovered by evaporating to a small volume the organic phase from which the Antibiotic ZN-6 may be precipitated on cooling or may be precipitated by adding to the concentrate a component which reduces the solubility of ZN-6, and preferably by evaporation of the organic phase to dryness and addition of benzene in order to obtain the readily crystallizable benzene solvate mentioned hereinbefore.

Alternatively, the acidic properties of Antibiotic ZN-6 permit the performance of a subsequent extraction of the organic phase with an aqueous alkaline solution or with an aqueous suspension of an alkaline compound, whereby more or less concentrated aqueous solutions of Antibiotic ZN-6 salts are obtained.

By acidification of such solutions, Antibiotic ZN-6 can be precipitated or, if desired, the salt of Antibiotic ZN-6 contained therein can be isolated as such.

In an appropriate embodiment of the invention the readily crystallizable benzene solvate is produced directly from the said aqueous solution of an Antibiotic ZN-6 salt, if necessary after having removed part of the water by evaporation, for instance in a vacuum evaporator, by adding to the aqueous concentrated solution a sufficient amount of benzene to form the solvate, and acidifying in order to precipitate Antibiotic ZN-6 in the form of the said solvate, which after isolation and drying yields either the pure benzene solvate or Antibiotic ZN-6 itself, depending upon the conditions of drying and the temperature used, the benzene being liberated from the solvate at elevated temperatures.

With regard to the purification of Antibiotic ZN-6, its ability to form solvates with certain solvents is an important feature. Thus for instance, in another appropriate embodiment of the invention, the crude Antibiotic ZN-6 is dissolved in a small volume of hot methanol, from which the methanol solvate crystallizes on cooling in a surprisingly pure form, so that this method is particularly suitable for obtaining a pharmaceutically acceptable quality of the substance. The said methanol solvate has a melting point of 179–179.5 degrees centigrade.

When salts of Antibiotic ZN-6 are desired, they can be produced by simple neutralization of Antibiotic ZN-6 or one of its solvates with the base in question in the presence of a suitable reaction medium facilitating the reaction and from which the salt may precipitate or, if necessary, can be precipitated by adding a suitable component to depress the solubility of the desired salt, or the salt can be isolated by evaporating the reaction mixture.

Alternatively, a salt of Antibiotic ZN-6 prepared in advance can be reacted with the base in question, or the desired salt of Antibiotic ZN-6 can be prepared by a double decomposition of a previously prepared Antibiotic ZN-6 salt and another salt containing the desired metal-ion or base.

Among the useful salts which have been prepared are the water-soluble sodium-, potassium-, ammonium-, triethylamine-, piperidine-, morpholine-, cyclohexylamine- and monoethanolamine salt, and the slightly water-soluble calcium-, magnesium-, dibenzyl-ethylene-diamine-, benzyl-$\beta$-phenylethylamine- and procaine salt. All of these have been prepared by procedures similar to those used for the preparation of the sodium salt and all have useful properties of the same character.

Among other salts which can be produced according to the method of the invention and which have similar properties may for instance be mentioned those containing as the base-component pyrrolidine, piperazine, guanidine, methylamine, ethylamine, benzylamine or similar unsubstituted or substituted amines. Furthermore quaternary amines as choline and its derivatives or other antibiotics having basic properties as for instance streptomycin form salts according to the invention which have similar properties.

The invention furthermore concerns therapeutical compositions adapted for use in the treatment of infectious diseases. The compositions of the invention contain as the therapeutically active component or components one or more members of the class consisting of Antibiotic ZN-6 and its salts with atoxic pharmaceutically acceptable bases, mixed up with solid or liquid pharmaceutical carriers and auxiliary agents.

In the said composition, the proportion of therapeutically active material to carrier substances and auxiliary agents can vary between 1% and 95%.

The composition in question can either be worked up to pharmaceutical forms of presentation such as tablets, pills, dragrees and suppositories, or the composition can be filled in medical containers such as capsules or ampoules or, as far as mixtures or ointments are concerned, the may be filled in bottles or tubes and similar containers.

Pharmaceutical organic or inorganic, solid or liquid carriers suitable for enteral, parenteral or local administration can be used to make up the composition, water, gelatine, lactose, starch, magnesium stearate, talc, vegetable and animal oils and fats, benzyl alcohol, gum, polyalkylene glycol, petroleum jelly, cocoa butter, lanolin or other known carriers for medicaments are all suitable as carriers, while stabilizing agents, wetting or emulsifying agents, salts for varying the osmotic pressure or buffers for securing an adequate pH-value of the composition can be used as auxiliary agents.

The water-soluble sodium salt of Antibiotic ZN-6, which is a stable crystalline substance, is one of the preferred active constituents of the compositions of the invention. On the other hand, for therapeutic purposes requiring a special absorption rate of the drug it will in some cases be advantageous to use a composition containing both a water-soluble salt and a sparingly water-soluble salt of Antibiotic ZN-6 as active constituents, and even the free Antibiotic ZN-6 may be used as such.

As an example of a composition according to the invention one may use an ointment adapted for the treatment of local infectious diseases of the skin and containing 10 mgs. of the Antibiotic ZN-6 sodium salt per gram. This ointment is prepared according to the following procedure:

| Ingredients: | Gms. |
|---|---|
| Antibiotic ZN-6 sodium salt | 10 |
| Cholesterol | 30 |
| Stearyl alcohol | 30 |
| White wax | 80 |
| White petrolatum | 850 |

The stearyl alcohol, white wax and white petrolatum are melted together on a steam bath. Thereafter the cholesterol is added and dissolved in the melted mixture which is then stirred until cold. The sodium salt of Antibiotic ZN-6 is sieved through an 80 mesh per linear inch sieve and triturated gradually with the ointment base.

Another object of the invention resides in the selection of a dose of the Antibiotic ZN–6 and its salts which can be administered so that the desired activity is achieved without simultaneous secondary effects.

It has been found that Antibiotic ZN–6 and its salts are conveniently administered in dosage units containing not less than 0.05 gm. and preferably from 0.1 to 1.0 gm. in total Antibiotic ZN–6, calculated as the free acid.

By the term "dosage unit" is meant a unitary, i.e. a single dose capable of being administered to the patients, and which may be readily handled and packed, remaining as a physically stable unit dose comprising either the active material as such as a mixture of it with solid or liquid pharmaceutical diluents or carriers.

It the composition is to be injected, a sealed ampoule, a vial or a similar container may be provided containing a parenterally acceptable aqueous or oily injectable solution or dispersion of the active material as a dosage unit mentioned above.

As an example of a dosage unit, the prescription below describes the preparation of suitable tablets containing each 0.250 gram of Antibiotic ZN–6 sodium salt.

| Ingredients: | Gms. |
| --- | --- |
| Antibiotic ZN–6 sodium salt | 250 |
| Lactose | 165 |
| Polyvinylpyrrolidone | 7 |
| Corn starch | 50 |
| Talc | 25 |
| Magnesium stearate | 3 |

The Antibiotic ZN–6 sodium salt and the lactose are screened through a 20 mesh per linear inch sieve and mixed together for 15 minutes. Thereafter the mixed powders are wetted with a solution of polyvinylpyrrolidone in 96% ethyl alcohol. The moist mass is passed through a 10 mesh per linear inch screen and then dried at 38 degrees centigrade. When the alcohol has evaporated, the granules are broken on a 16 mesh per linear inch sieve and mixed with the corn starch, talc and magnesium stearate. The granulate is compressed into tablets of 0.50 gram weight using $^{19}/_{32}$ inch punches and dies, yielding 1000 tablets each containing 0.250 gram of the Antibiotic ZN–6 sodium salt.

In a particular preferred form of administration, capsules are employed of, for instance gelatine or another material easily digestible or disintegrable in the intestinal tract, preferably containing 0.250 gram of the Antibiotic ZN–6 sodium salt, if necessary, mixed with minor amounts of auxiliary substances in order to obtain a free-flowing powder fitted for the purpose of filling the capsules. Such capsules are conveniently prepared in accordance with the following description.

| Ingredients: | Gms. |
| --- | --- |
| Antibiotic ZN–6 sodium salt | 250 |
| Lactose | 27 |
| Magnesium stearate | 3 |

The ingredients are passed through a 60 mesh per linear inch sieve and mixed for 15 minutes. The mixture is filled into No. 0 gelatine capsules (Parke, Davis and Co.), using a semi-automatic capsule-filling machine shaken by vibrator. Each capsule contains 280 mgs. of the mixture corresponding to 250 mgs. of the Antibiotic ZN–6 sodium salt.

The invention will now be illustrated by the following examples from which the details of the embodiments will be apparent.

EXAMPLE 1

*The Benzene Solvate of Antibiotic ZN–6*

In a 1.5 m.$^3$ fermentation tank of stainless steel equipped with an agitator 1.00 m.$^3$ of a culture medium of the following composition was made up:

| | Kgs. |
| --- | --- |
| Glucose | 20.0 |
| Meat and bone meal | 20.0 |
| Corn steep liquor, 50% dry substance | 2.5 |
| Glycerol | 7.5 |
| NaCl | 4.0 |
| MgSO$_4$ | 0.05 |
| Tap-water up to 1000 liters. | |

The culture medium had a pH-value of 6.1, which value was adjusted to 6.5 by adding a dilute solution of NaOH, whereafter the medium was sterilized by heating. After cooling it was inoculated with 3 liters of a culture of *Fusidium coccineum* Fuck (K. Tubaki) grown for 48 hours in a shaking flask at 28 degrees centigrade. The contents of the tank were stirred and aerated at a rate of 0.6 m.$^3$ of air per hour at 28 degrees centigrade for 96 hours. During this period of time it was not necessary to adjust the pH in order to maintain the aforesaid value of 6.5. After the said period of fermentation the antibiotic activity of the culture medium determined by the usual agar cup test on *Staphylococcus aureus* was found to correspond to a content of 70 mgs. of Antibiotic ZN–6 per liter by comparing it with the activity of that substance determined by the same method.

The mycelium was separated from the culture medium by filtration, and the amount of filtrate was 700 liters. The pH of the filtrate was adjusted to 3.3 by adding a 25% solution of H$_2$SO$_4$, and the filtrate was extracted with 230 liters of butyl acetate in counter-current in a Podbielniak extractor. The butyl acetate phase thereby obtained was extracted with one portion of 77 liters of water to which a 10% solution of NaOH was added until the pH of the aqueous phase was 10.0, whereafter the aqueous phase was separated from the butyl acetate phase. The pH of the aqueous phase was adjusted to 3.2 by adding a 25% solution of H$_2$SO$_4$, and the solution was extracted with 40 liters of methyl isobutyl ketone. The methyl isobutyl ketone phase was separated from the aqueous phase, treated with 40 grams of active carbon, and subsequently evaporated to dryness in vacuo at a boiling temperature of 25 degrees centigrade. The residue was dissolved in 500 mls. of benzene and the solution was left standing overnight in a refrigerator. Thereby, the benzene solvate of Antibiotic ZN–6 crystallized. It was filtered off and recrystallized from benzene, yielding 12.0 grams of the pure substance with a melting point of 189–189.5 degrees centigrade.

EXAMPLE 2

*The Sodium Salt of Antibiotic ZN–6*

500 mgs. of the benzene solvate produced according to Example 1 were suspended in 20 mls. of water, and to the suspension was added ½ N aqueous NaOH until the pH was 9.0. The solution was filtered, and to the filtrate 50 mls. of n-butanol were added, whereafter the water content of the solution was removed by azeotropic distillation in vacuo. From the residue the desired sodium salt was precipitated by addition of ether. It was filtered off, washed with ether and dried. By recrystallization from ethanol-acetone, 360 mgs. of the pure, crystalline sodium salt were obtained.

EXAMPLE 3

*Production of Antibiotic ZN–6*

Spores of *Fusidium coccineum* Fuck (K. Tubaki) were transferred from an agar slant to 3 liters of a sterile broth medium of the following composition:

| | Gms. per liter |
| --- | --- |
| Glycerine | 7.5 |
| Corn steep liquor | 2.5 |
| Glucose | 10.0 |

| | Gms. per liter |
|---|---|
| $KH_2PO_4$ | 0.6 |
| Soy bean meal | 3.0 |
| NaCl | 4.0 |
| $MgSO_4.7H_2O$ | 0.5 |
| $FeSO_4.7H_2O$ | 0.005 |
| $CuSO_4.5H_2O$ | 0.004 | and the culture was aerobically incubated at 27 degrees centigrade for 40 to 60 hours in a reciprocating shaker. The seed material thus obtained can be used directly as an inoculum for a commercial scale fermentor. In this case, however, it was transferred to a 700 liter vessel containing a culture medium of the same composition as that of the commercial scale fermentor, and was incubated at 26 degrees centigrade for 40–48 hours in order to achieve the development of vegetative growth of the fungus before inoculating the main fermentor.

Subsequently 16 $m.^3$ of a culture medium of the following composition:

| | |
|---|---|
| Glucose gms. per liter | 30 |
| Glycerine do | 5 |
| $KH_2PO_4.2H_2O$ do | 5 |
| $NaNO_3$ do | 6 |
| KCl do | 0.5 |
| $MgSO_4.7H_2O$ do | 0.5 |
| $ZnSO_4.6H_2O$ mg. per liter | 1.0 |
| Yeast extract (Difco) gms. per liter | 0.12 | which before sterilization had been adjusted to a pH-value of 7.2 was sterilized in the main fermentor at a temperature of 120 degrees centigrade for ½ hour and after cooling it was inoculated with one of the two forms of inoculation material mentioned before. While agitating and forcing in air through a sparker at a rate of the order of 0.5 liter of air per liter of culture fluid per minute the mycelium was produced and the fermentation continued at 26 degrees centigrade for 4 days.

The activity of samples of culture filtrated was determined throughout the fermentation by measuring the inhibition zone produced in the agar cup method in which *Staphylococcus aureus* was the test organism. When the process was finished, the activity obtained corresponded to a concentration of Antibiotic ZN–6 in the culture medium amounting to 150 m$\mu$-gms. per ml.

EXAMPLE 4

*Production of Antibiotic ZN–6*

16 $m.^3$ of a culture medium of the following composition:

| | Gms. per liter |
|---|---|
| Corn steep liquor, 50% | 2.5 |
| Soy bean meal or meat meal | 10.0 |
| Saccharose | 30.0 |
| Glycerine | 7.5 |
| NaCl | 4.0 |
| $KH_2PO_4$ | 0.5 |
| $MgSO_4.7H_2O$ | 0.5 | which before sterilization had been adjusted to a pH of 6.80 was sterilized in the fermentor at 120 degrees centigrade for ½ hour. After cooling the medium was inoculated with the inoculum mentioned in Example 3, and the fermentation was continued for 100 hours, thereby yielding an Antibiotic ZN–6 concentration in the culture medium amounting to 260 m$\mu$-gms. according to the agar cup assay.

EXAMPLE 5

*Production of Antibiotic ZN–6*

16 $m.^3$ of a culture medium of the following composition:

| | Gms. per liter |
|---|---|
| Saccharose | 60.0 |
| Corn steep liquor, 50% | 20.0 |
| $KH_2PO_4$ | 10.0 |
| $MgSO_4.7H_2O$ | 0.5 | which before sterilization had been adjusted to a pH of 6.8 was sterilized in the fermentor at 120 degrees centigrade for ½ hour and after cooling inoculated with the inoculum mentioned in Example 3. After fermenting for 100 hours under conditions similar to those of Example 3, the yield of Antibiotic ZN–6 amounted to 250 m$\mu$-gms. per ml. of culture medium.

EXAMPLE 6

*Isolation and Purification of Antibiotic ZN–6*

The clarified fermentation broth (15 $m.^3$) from Example 5 (containing 3.75 kgs. of Antibiotic ZN–6 as determined by the agar cup method) was adjusted to a pH of 6.0 and extracted in a Podbielniak extractor with 3000 liters of methyl isobutyl ketone. This extract, which contained 3.4 kgs. of Antibiotic ZN–6, was subsequently extracted with 600 liters of aqueous sodium hydroxide of pH 11.5. Immediately after extraction the aqueous phase was adjusted to a pH of 9.3 and evaporated in a vacuum evaporator to a volume of 150 liters containing 3.25 kgs. of Antibiotic ZN–6.

40 liters of benzene was added, and, while stirring, the pH of the aqueous phase was adjusted to 5.0 by addition of hydrochloric acid. The stirring was continued for 4 hours, after which the precipitate, consisting of Antibiotic ZN–6 benzene solvate was filtered off, washed with water and benzene and dried. The crude product (2.8 kgs.) was dissolved in 12 liters of methylene chloride, filtered and evaporated to dryness in vacuo. The residue was dissolved in 3.2 liters of hot methanol, and upon cooling to 0 degrees centigrated a methanol solvate crystallized which was filtered off, washed with 3 x 300 mls. of ice-cold methanol and dried, yielding 2.48 kgs. of colorless methanol solvate.

This product was suspended in a mixture of 750 mls. of methanol and 1750 mls. of acetone, and after the addition of a few drops of phenolphthalein indicator, 33% aqueous sodium hydroxide was added while stirring until a faint red color developed. The resulting solution was filtered through dicalite, mixed with 5 liters of methyl isobutyl ketone and concentrated in vacuo to about 3 liters. During the concentration the sodium salt crystallized. It was filtered off, washed with acetone followed by ether and dried to yield 2.35 kgs. of pure sodium salt.

EXAMPLE 7

*Antibiotic ZN–6 Salts With Organic Bases*

GENERAL PROCEDURE

To a solution of 517 mgs. of Antibiotic ZN–6 in 5 mls. of acetone, one millimole of the organic base followed by 2.5 mls. of hexane were added, after which the salts crystallized by scratching. They were collected and purified by recrystallization from an appropriate solvent.

| Base | Recrystallized From— | M.P., ° C. |
|---|---|---|
| Triethylamine | Acetone | 143–144. |
| Piperidine | do | 155–156. |
| Morpholine | do | 112–114. |
| Cyclohexylamine | do | 180–182. |
| Dibenzyl-ethylene diamine [1] | Ethyl-acetate | 112–113. |
| Benzyl-$\beta$-phenylethylamine [1] | Acetone-hexane | 103–105. |
| Monoethanolamine | do | 130–132. |
| Procaine [1] | | amorphous. |

[1] Sparingly soluble in water.

EXAMPLE 8

*Recovery of Antibiotic ZN–6 From the Fermentation Broth*

200 mls. of the anion-exchange resin Amberlite IRA 401 S (OH) were stirred for two hours with three 2 liter portions of a clarified broth containing 110$\gamma$ of Antibiotic ZN-6 per ml. During the stirring the pH was kept at 9.5 by addition of 2 N aqueous sodium hydroxide.

Analyses of the filtrates showed that 85% of the Antibiotic ZN-6 had been absorbed on the resin. After filtration the resin was washed with three 1.5 liter portions of water and thereafter suspended in 500 ml. of acetone. While stirring the pH was lowered to 3.6 during three hours by addition of 6 N hydrochloric acid, whereafter the resin was filtered off and washed with acetone (2 x 100 mls.).

The combined filtrate and washing contained 375 mgs. of Antibiotic ZN-6, corresponding to 57% of the amount present in the broth.

EXAMPLE 9

*Recovery of Antibiotic ZN-6 From the Fermentation Broth*

1 liter of a clarified broth containing 500 mgs. of Antibiotic ZN-6 was stirred for one hour with 5 gs. of decolourizing carbon (S.E.C.A. III). After filtration, the filtrate was analyzed and found to contain less than 25 mgs. of Antibiotic ZN-6. The filter-cake was washed with water and thereafter refluxed with 100 mls. of methanol for two hours, cooled and filtered. The filtrate contained about 150 mgs. of Antibiotic ZN-6.

In view of our invention and disclosure, variations and modifications to meet individual whim or particular need will doubtless become evident to others skilled in the art, to obtain all or part of the benefits of our invention without copying the process and composition shown, and we, therefore, claim all such insofar as they fall within the reasonable spirit and scope of our claims.

Having thus described our invention, what we claim as new and desire to secure by Letters Patent is:

1. A weakly acidic antibiotic designated Antibiotic ZN-6, that is sparingly soluble in water and hexane, and soluble in ethanol, acetone, methyl isobutyl ketone, amyl acetate and chloroform; melting at 191-192 degrees centigrade, having a specific rotation $[\alpha]_D^{22}$ of minus 9 degrees in a 1% solution in chloroform; whose spectrum in the infra-red region, using the potassium bromide technique, exhibits characteristic absorption bands as shown on the drawing and exhibiting the values at the following frequencies expressed in reciprocal centimeters: 1265, 1385, 1695, 1730 and 3450; having at 220 m$\mu$ a molar extinction coefficient of 8000 in ethanol and no characteristic absorption bands above this wave-length; having the molecular formula $C_{31}H_{48}O_6$ and containing in the molecule a cyclopentenopolyhydrophenanthrene ring system which is substituted with two hydroxyl groups, one acetoxy group and four methyl groups, and which in the 17-position is connected by a double bond with the $\alpha$-carbon atom of 5-methyl-4,5-heptenoic acid; and forms antibiotically active salts with pharmaceutically acceptable inorganic and organic bases.

2. As an antibiotically active compound, the sodium salt of Antibiotic ZN-6 as defined in claim 1.

3. As an antibiotically active compound, the calcium salt of Antibiotic ZN-6 as defined in claim 1.

4. As new compounds, the solvates of Antibiotic ZN-6 as defined in claim 1 with pharmaceutically acceptable solvents.

5. As a new compound, the benzene solvate of Antibiotic ZN-6 as defined in claim 1.

6. As a new compound, the methanol solvate of Antibiotic ZN-6 as defined in claim 1.

7. A process for producing Antibiotic ZN-6 as set forth in claim 1 containing fermentation broth, comprising cultivating the fungus *Fusidium coccineum* Fuck (K. Tubaki) in an aqueous nutrient-containing carbohydrate solution until substantial antibiotic activity is imparted to said solution.

8. In a process for producing Antibiotic ZN-6 as set forth in claim 1, the step of extracting with an organic solvent or mixture of solvents the Antibiotic ZN-6 from an aqueous medium containing the substance.

9. In a process for producing Antibiotic ZN-6 as set forth in claim 1, the steps of adsorbing Antibiotic ZN-6 as set forth in claim 1 from an aqueous medium by intimately contacting the aqueous medium with a solid adsorbing agent, and eluting the Antibiotic ZN-6 from the solid adsorbing agent.

10. In a process for purifying Antibiotic ZN-6 as set forth in claim 1, the steps comprising dissolving in benzene the crude substance, crystallizing its benzene solvate from the solution, separating the benzene solvate thus precipitated and driving off the solvent to liberate Antibiotic ZN-6 as set forth in claim 1.

11. In a process for concentration of Antibiotic ZN-6 as set forth in claim 1, the step which comprises extracting a solution of said substance in a water-immiscible solvent or mixture of solvents with an aqueous alkaline medium, thereby obtaining a concentrated aqueous solution of an Antibiotic ZN-6 salt.

12. In a process for the isolation of Antibiotic ZN-6 as set forth in claim 1 from aqueous solutions containing the same, the steps comprising adding benzene to said solution, acidifying the mixture, separating the benzene solvate of Antibiotic ZN-6 thus precipitated and producing therefrom a compound of the class consisting of Antibiotic ZN-6 as set forth in claim 1 and a salt thereof.

13. In a process for producing pure salts of Antibiotic ZN-6 as set forth in claim 1, the steps comprising crystallizing its methanol solvate from a concentrated solution of Antibiotic ZN-6 in methanol, separating the methanol solvate from the solvent and converting it to a salt of Antibiotic ZN-6 with a pharmaceutically acceptable base.

14. As antibiotically active compounds, the salts of Antibiotic ZN-6 as defined in claim 1, with pharmaceutically suitable base of the class consisting of inorganic and organic bases.

15. In a process of purifying Antibiotic ZN-6 as set forth in claim 1, the steps comprising dissolving in benzene the crude substance, crystallizing its benzene solvate from the solution, separating the benzene solvate thus precipitated, neutralizing the product with a base to produce a salt thereof and separating the salt from the solvent.

16. A therapeutical composition adapted for use in the treatment of infectious diseases containing as a therapeutically active compound thereof a member of the class consisting of Antibiotic ZN-6 as set forth in claim 1 and its salts with atoxic pharmaceutically acceptacle bases, mixed with a material of the class consisting of solid and liquid pharmaceutical carriers and auxiliary agents, in which the proportion of therapeutically active material of said class is between 1 and 95 percent of the total composition.

17. For the treatment of infectious diseases, a readily adaptable dosage unit, containing at least one member selected from the group consisting of Antibiotic ZN-6 as defined in claim 1 and its salts with atoxic pharmaceutically acceptable bases, the said dosage units having a content of Antibiotic ZN-6 calculated as the free acid from 0.05 to 1.00 grams in total.

18. A dosage unit as claimed in claim 17, in which said member of the group is mixed with a vehicle.

No references cited.